United States Patent
Monajemi et al.

(10) Patent No.: US 12,507,295 B2
(45) Date of Patent: Dec. 23, 2025

(54) RADIOS WITH SIMULTANEOUS TRANSMIT AND RECEIVE

(71) Applicant: Cisco Technology, Inc., San Jose, CA (US)

(72) Inventors: Pooya Monajemi, Irvine, CA (US); Ardalan Alizadeh, Milpitas, CA (US); Matthew Aaron Silverman, Shaker Heights, OH (US); Brian D. Hart, Sunnyvale, CA (US); Vishal Satyendra Desai, San Jose, CA (US); Santosh Babaji Kulkarni, San Jose, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 539 days.

(21) Appl. No.: 17/812,739

(22) Filed: Jul. 15, 2022

(65) Prior Publication Data

US 2024/0023179 A1    Jan. 18, 2024

(51) Int. Cl.
*H04W 74/00*    (2009.01)
*H04W 76/15*    (2018.01)
*H04W 88/08*    (2009.01)

(52) U.S. Cl.
CPC ............ *H04W 76/15* (2018.02); *H04W 88/08* (2013.01)

(58) Field of Classification Search
CPC .............................. H04W 76/15; H04W 88/08
See application file for complete search history.

(56) References Cited

U.S. PATENT DOCUMENTS

| | | |
|---|---|---|
| 2021/0250963 A1 | 8/2021 | Seok et al. |
| 2021/0352715 A1 | 11/2021 | Seok et al. |
| 2021/0400662 A1 | 12/2021 | Huang et al. |
| 2022/0029736 A1 | 1/2022 | Chu et al. |
| 2022/0070791 A1 | 3/2022 | Kim et al. |
| 2022/0124857 A1 | 4/2022 | Patil et al. |

(Continued)

FOREIGN PATENT DOCUMENTS

| | | |
|---|---|---|
| WO | 2021230566 A1 | 6/2021 |
| WO | 2021109485 A1 | 10/2021 |
| WO | 2022032150 A1 | 2/2022 |

OTHER PUBLICATIONS

Lopez-Raventos, Alvaro et al., "IEE 802.11be Multi-Link Operation: When the Best Could Be to Use Only a Single Interface" Arxiv.org; May 21, 2021 (7 pages).

*Primary Examiner* — Lakeram Jangbahadur
(74) *Attorney, Agent, or Firm* — Merchant & Gould P.C.

(57) ABSTRACT

An arrangement of three radios maybe provided. The three radios define first and second outer data links and a middle data link. Access to the arrangement of three radios can be biased to the middle data link in one direction upon a data transmission through the first and second outer data links being dominate in an opposite direction. Data transmission with enhanced multi-link single radio (eMLSR) client devices can be prioritized lower than data transmission with simultaneous transmit and receive radio (STR) client devices and non-simultaneous transmit and receive radio (NSTR) client devices. A radio can be configured for data transmission with a client device. The range of the radio is limited when the data traffic through the radio exceeds a determined number of bytes of data in a determined amount of time.

20 Claims, 6 Drawing Sheets

(56) References Cited

U.S. PATENT DOCUMENTS

| | | | | |
|---|---|---|---|---|
| 2022/0345973 A1* | 10/2022 | Sun | ............... | H04W 74/0816 |
| 2023/0029957 A1* | 2/2023 | Xin | ............... | H04W 74/0866 |
| 2023/0139168 A1* | 5/2023 | Xin | ............... | H04W 74/0866 |
| | | | | 370/311 |
| 2023/0284303 A1* | 9/2023 | Ko | ............ | H04W 48/12 |
| | | | | 370/310 |
| 2024/0040646 A1* | 2/2024 | Ma | ............... | H04W 52/0216 |
| 2024/0129866 A1* | 4/2024 | Ko | ............ | H04W 84/12 |
| 2024/0340975 A1* | 10/2024 | Hwang | ............ | H04W 84/12 |

* cited by examiner

RADIOS WITH SIMULTANEOUS TRANSMIT AND RECEIVE

TECHNICAL FIELD

This patent document relates to radios, and more particularly, to radios with simultaneous transmit and receive.

BACKGROUND

In computer networking, a wireless Access Point is a networking hardware device that allows a Wi-Fi compatible client device to connect to a wired network and to other client devices. The access point usually connects to a router (directly or indirectly via a wired network) as a standalone device, but it can also be an integral component of the router itself. Several access points may also work in coordination, either through direct wired or wireless connections, or through a central system, commonly called a Wireless Local Area Network (WLAN) controller. An access point is differentiated from a hotspot, which is the physical location where WiFi access to a WLAN is available.

Prior to wireless networks, setting up a computer network in a business, home, or school often required running many cables through walls and ceilings in order to deliver network access to all of the network-enabled devices in the building. With the creation of the wireless access point, network users are able to add devices that access the network with few or no cables. An access point connects to a wired network, then provides radio frequency links for other radio devices to reach that wired network. Most access points support the connection of multiple wireless devices. access points are built to support a standard for sending and receiving data using these radio frequencies.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
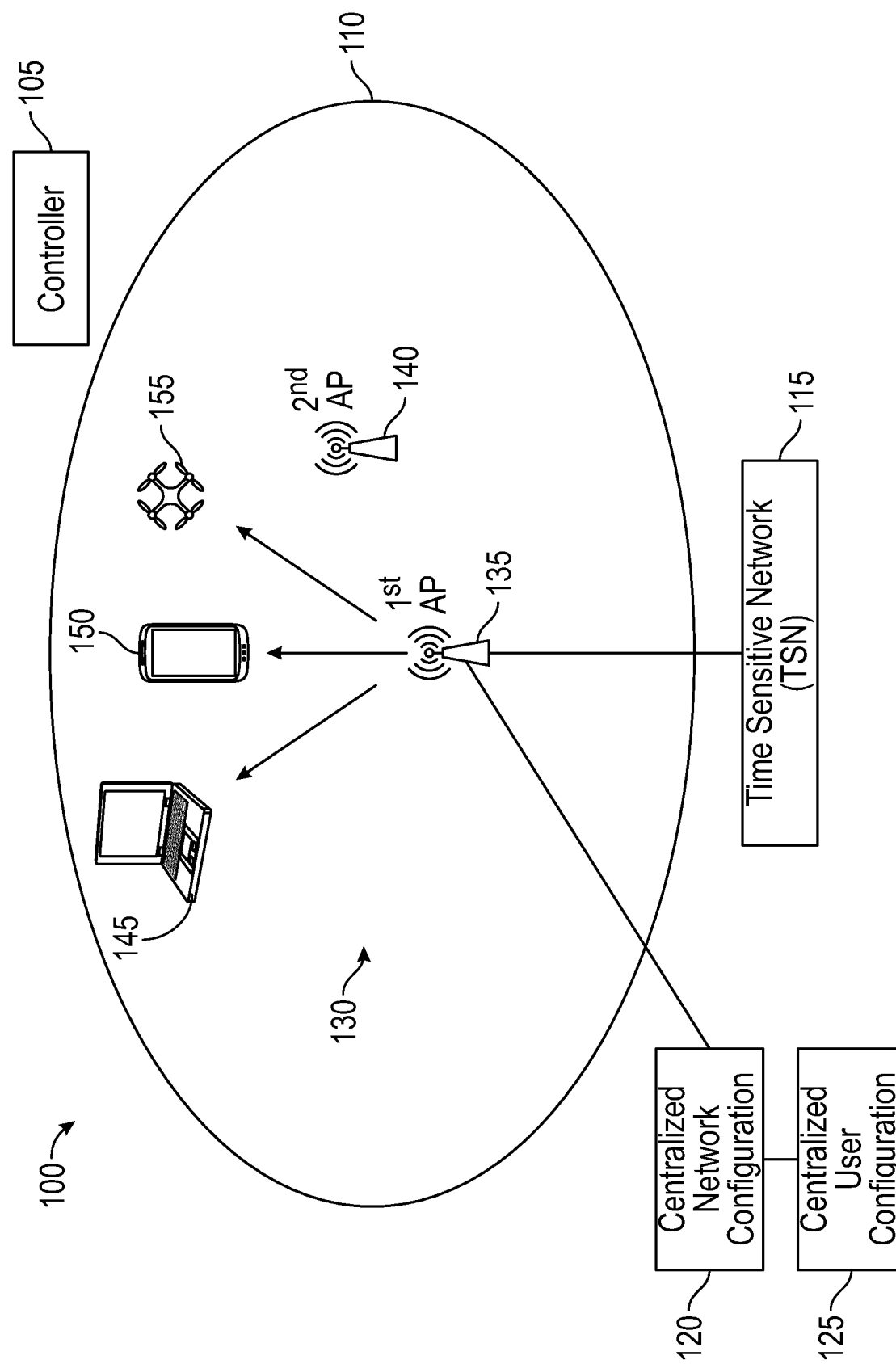
FIG. 1 is a block diagram of an operating environment for WiFi access points having simultaneous transmit and receive radios.

An arrangement of three radios maybe provided. The three radios define first and second outer data links and a middle data link. Access to the arrangement of three radios can be biased to the middle data link in one direction upon a data transmission through the first and second outer data links being dominate in an opposite direction. Data transmission with enhanced multi-link single radio (eMLSR) client devices can be prioritized lower than data transmission with simultaneous transmit and receive radio (STR) client devices and non-simultaneous transmit and receive radio (NSTR) client devices. A radio can be configured for data transmission. The range of the radio is limited when the data traffic through the radio exceeds a determined number of bytes of data in a determined amount of time.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. Data transmission with enhanced multi-link single radio (eMLSR) client devices is prioritized lower than data transmission with simultaneous transmit and receive (STR) radios on client devices and non-simultaneous transmit and receive (NSTR) radios on client devices.

At least some embodiments may provide for scheduling radios for devises such as access points with more than one simultaneous transmit and receive (STR) constraints. At least some embodiments may provide load balancing techniques in WiFi 7 for multi-link devices (MLD).

Managing STR constraints is a new problem arising from the advent of multi-link device MLDs operating according to standards set forth in IEEE 802.11be, which were issued by the Institute of Electrical and Electronic Engineers. Multi-link operation (MLO) is the concurrent utilization of multiple radio links of different frequency channels/bands by an AP, a client, or both. In general terms, a link or data link is a radio frequency (RF) connection between two radios at a determined frequency. It can be used for the communication of data.

A difficulty is that a device with insufficiently strong filtering between its two radios will not be able to receive a signal on one radio while another radio is transmitting. This problem may be due to out-of-band leakage energy from the transmitter, generating interference at the receiver. Two or more radios providing data links on a device are called an "NSTR" radios when such constraints are present, although they typically occur in pairs. Two or more links established on the radios also can be referred to as an NSTR links.

Solutions for this problem have been discussed in IEEE 802.11be for situations when one pair of links is NSTR. This pair of NSTR links is widely expected to be in the 5 GHz and 6 GHz spectrums. A sufficient distance between the 2.4 GHz and the 5 GHz and 6 GHz spectrums is expected to allow for STR operation with inexpensive hardware when one radio is operating in the 2.4 GHz spectrum.

Scenarios may arise for radios where more than one pairwise NSTR relationships exist between links activated on a device. An example of such a radio may include a tri-radio device that operate three links in the 5 GHz and 6 GHz spectrums. For these radios, the middle radio or link is NSTR and the outer radios links are STR.

Another example may include dual-radio devices that use a third link for wake-up operation (TGba). Other nearby bands such as 3.5 GHz (or a future new spectrum) will create more possibilities for multi-NSTR devices. Additionally, while one pair of NSTR radios or links is symmetric, asymmetries arise when multiple NSTR relations exist.

Additionally, the problem of load balancing between radios has not been addressed with the introduction of WiFi 7 multi-link devices, and it may have been aggravated. This problem at least in part results from too much freedom given to client device-side implementations when selecting a preferred link of operation when multiple links are set up in association time. For example, a majority of client devices may choose to operate in the 6 GHz spectrum in spite of being associated on both the 5 GHz and 6 GHz spectrum, possibly because they prefer to leave the 5 GHz spectrum free for other operations that may or may not be active. TGbe is likely to provide some tools to the access point that may be used to balance the load between radios in the future, including link recommendation tools as well as enforceable link disablement schemes.

FIG. 1 shows an operating environment 100 for radios in a WiFi network, including arrangements of multiple radios such as those that may be included in an access point, client device, or other MLD. As shown in FIG. 1, operating environment 100 may comprise a controller 105, a coverage environment 110, a Time Sensitive Network (TSN) 115, a Centralized Network Configuration (CNC) server 120, and a Centralized User Configuration (CUC) 125 server. Coverage environment 110 may comprise, but is not limited to, a Wireless Local Area Network (WLAN) comprising a plurality of stations 130. The plurality of stations 130 may comprise a plurality of Access Points and a plurality of client devices. At any given time, any one of the plurality of stations 130 may comprise an Initiating Station (ISTA) or a Responding Station (RSTA). The plurality of access points may provide wireless network access (e.g., access to the WLAN) for the plurality of client devices. The plurality of access points may comprise a first access point 135 and a second access point 140. Each of the plurality of access points may be compatible with specification standards such as, but not limited to, the Institute of Electrical and Electronics Engineers (IEEE) 802.11 specification standard for example. A coverage environment 110 may comprise, but is not limited to, an outdoor wireless environment, such as a mesh (e.g., a Wi-Fi mesh). Embodiments of the disclosure also may apply to indoor wireless environments and non-mesh environments.

Ones of the plurality of client devices may comprise, but are not limited to, a smart phone, a personal computer, a tablet device, a mobile device, a telephone, a remote-control device, a set-top box, a digital video recorder, an Internet-of-Things (IoT) device, a network computer, a router, an Automated Transfer Vehicle (ATV), a drone, an Unmanned Aerial Vehicle (UAV), or other similar microcomputer-based device. In the example shown in FIG. 1, the plurality of client devices may comprise a first client device 145 (e.g., a laptop computer), a second client device 150 (e.g., a smart phone), and a third client device 155 (e.g., a drone).

Controller 105 may comprise a Wireless Local Area Network controller (WLC) and may provision and control an operating environment 100 (e.g., the WLAN). Controller 105 may allow the plurality of client devices to join the operating environment 100. In some embodiments of the disclosure, the controller 105 may be implemented by a Digital Network Architecture Center (DNAC) controller (i.e., a Software-Defined Network (SDN) controller) that may configure information for the operating environment 100 in order to provide bi-directional gates for scheduling consistent with embodiments of the disclosure.

The elements described above in the operating environment 100 (e.g., controller 105, CNC server 120, CUC, 125 server, first access point 135, second access point 140, first client device 145, second client device 150, and third client device 155) may be practiced in hardware, software (including firmware, resident software, micro-code, etc.), in any other circuits or systems, or in combinations thereof. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 also may be practiced using other technologies capable of performing logical operations such as, for example, AND, OR, and NOT, including but not limited to, mechanical, optical, fluidic, and quantum technologies. As described in greater detail below with respect to FIG. 9, the elements of operating environment 100 may be practiced in a computing device 900.

Figure 2:
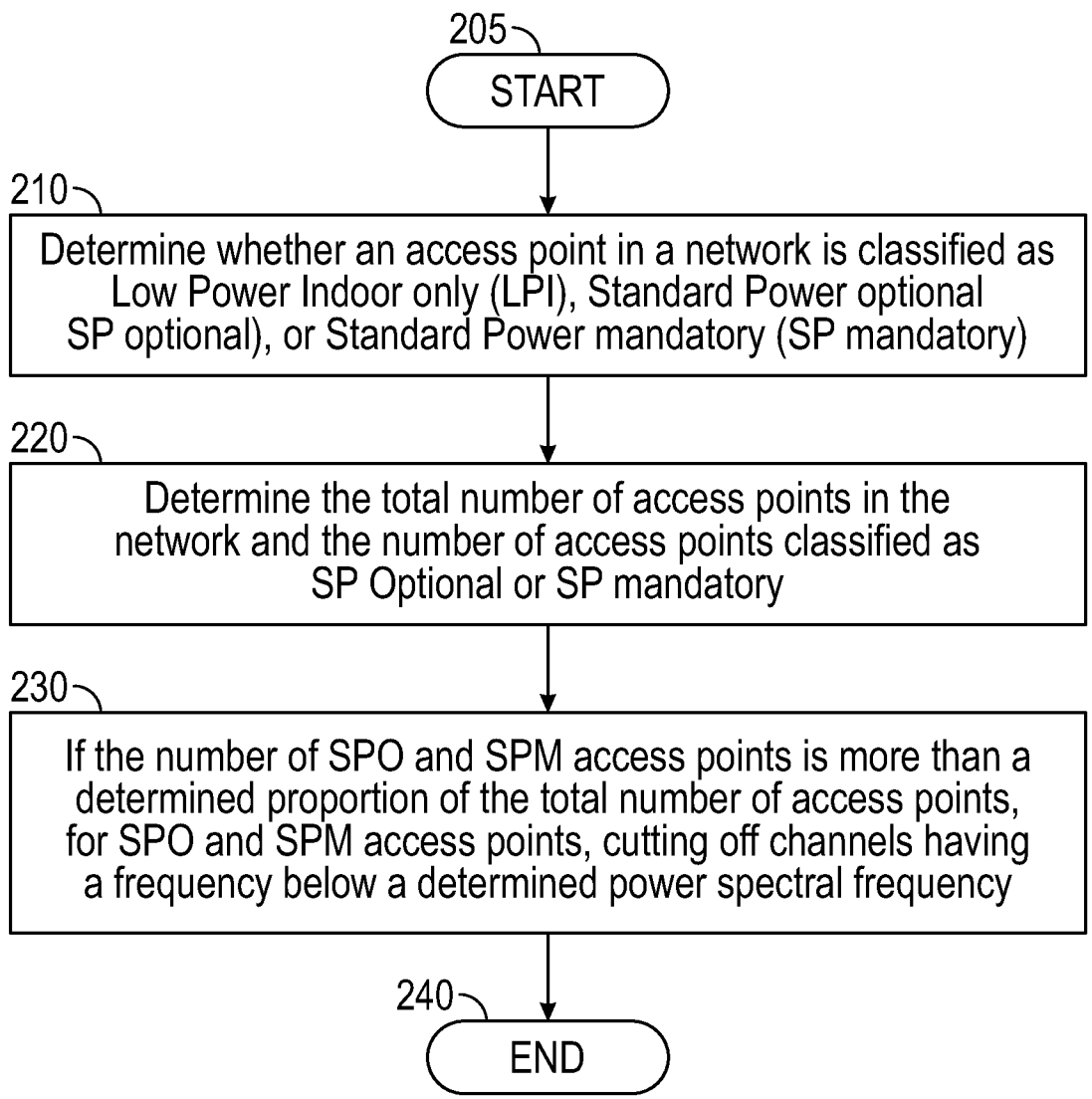
FIG. 2 is a flow chart illustrating a process for managing STR constraints

FIG. 2 is a flow chart illustrating a process for managing STR constraints in an MLD such as an access point having an arrangement of multiple radios such as a configuration of three radios. The process starts at operation 200. For an access point having three radios defining two outer data links and a middle data link, the process includes transmitting a signal through at least one of the outer data links. Operation 210. The process also includes biasing access to the middle data link in one direction upon a data transmission through the first and second outer data links being dominate in an opposite direction. Operation 215. Ways to implement the operations of method 200 are described in more detail herein. Additional operations can be included in the process are also described in more detailer herein.

Figure 3A:
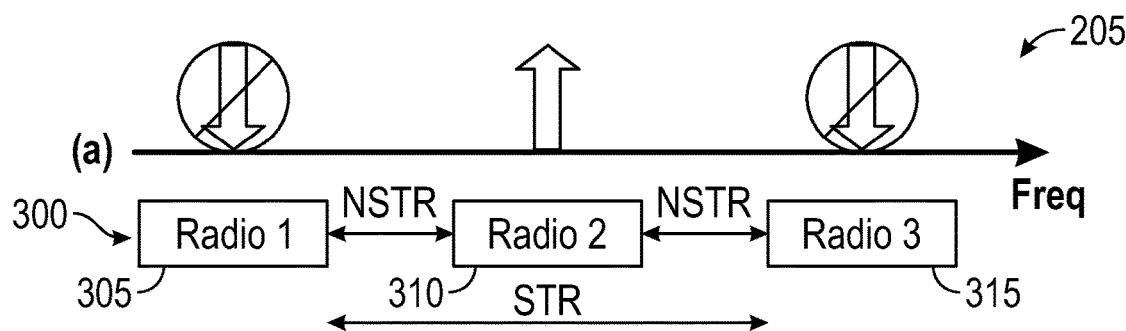
FIGS. 3A and 3B illustrate an access point having three radios.
Figure 3B:
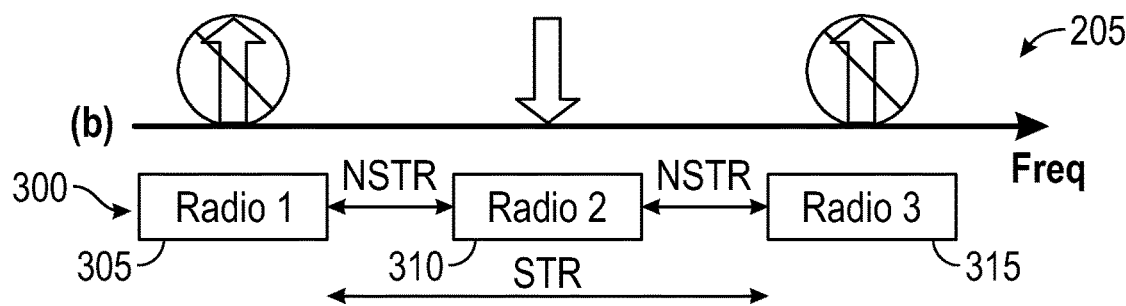

Referring now to FIGS. 3A and 3B, three radio device 300 has first, second, and third radios 305, 310, 315. The first and third outer radios 305, 315 transmit and receive radio signals defining outer data links, the second middle radio 310 transmits and receives a radio signal defining a middle data link. The first outer radio 305 establishes links in one portion of the frequency spectrum, the third outer radio 315 establishes links in another portion of the spectrum, and the second middle radio 310 establishes links in the spectrum between the first and third outer radios 305, 315. There is an NSTR relationship between adjacent data links, e.g., between the first and second radios 305, 310 and between the second and third radios 310, 315. The three radios 305, 310, 315 contend for medium access on all three links.

As shown in FIG. 3A, If the middle radio 310 wins contention first and is actively transmitting data in the uplink direction, then neither the first nor the third outer radios 305, 315 can receive data in the opposite, downward direction. Similarly, as shown in FIG. 3B, when the middle radio 310 starts receiving data, any transmission by the first and third outer radios 305, 315 will disrupt the reception. As a result, the operation performed by the middle radio 310 imposes a direction on the first and third outer radios 305, 315.

Another problem relates to signal timing because all NSTR radios need to end their physical layer protocol data units (PPDU) at the same time in order to successfully receive an immediate response in the opposite direction. This timing problem does not exist when either of the outer radios 305, 315 start to transmit before the middle radio 310. In that situation, the outer radios 305, 315 can operate independently from each other and from the middle radio.

At least two types of load imbalance include load imbalances and latency imbalances. For load imbalances, when traffic is dominant in one direction, access to the middle radio 310 should be biased against the opposite direction. For example, if a downlink-dominant traffic is present, the client device steers most of uplink traffic to one of the outer radios 305, 315, and the access point avoids triggering the client device on the middle radio 310. Similarly, when the access point is transmitting on at least one of the outer radios 305, 315, it avoids receiving a signal from a client device on the middle radio 310. This biasing or prioritization may be applied in multiple methods. For example, the access point can use brute force. In another example, enhanced distributer channel access (EDCA) configurations may be modified to bias access to the middle radio 310. Yet another example is scheduler queue management. Any implementation of a scheduler or retry algorithm can be modified to add preference to the outer or middle radios 305, 310, 315. The scheduler or retry algorithm can enqueue data traffic for the outer radios 305, 315 first, disallow the first (or first N) retries on the middle radio 310, or a combination thereof.

Figure 4:
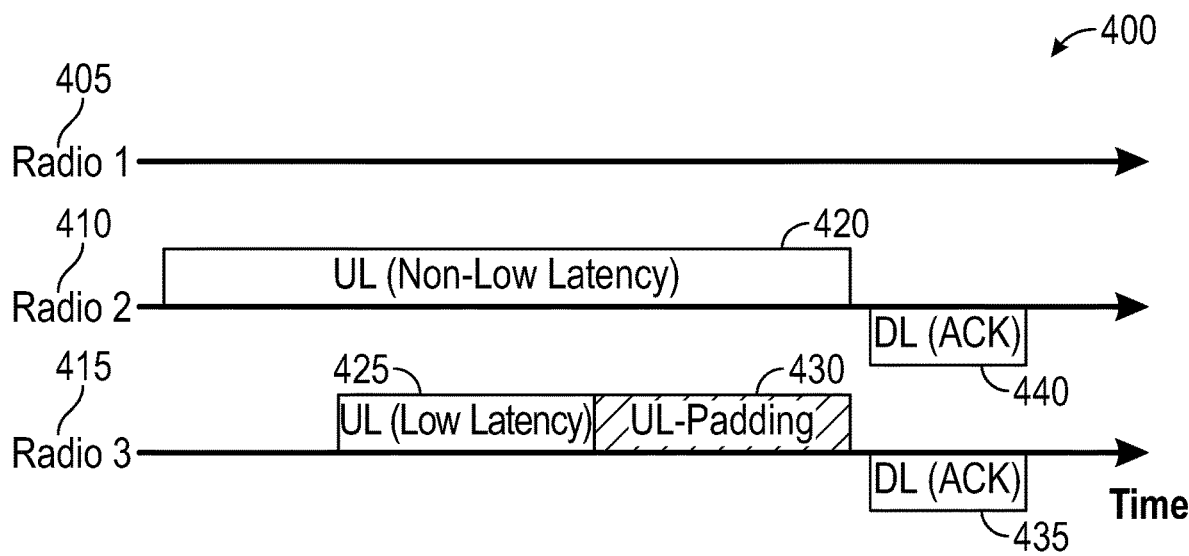
FIG. 4 illustrates a scheme for handling latency imbalance.

FIG. 4 illustrates a scheme 400 for handling latency imbalance. When latency-sensitive traffic is defined in one direction, access to the middle radio 410 in the opposite direction is restricted. At least some of the methods described herein may be used to bias or restrict data traffic for the middle radio 410. However, transmission opportunity (TXOP) duration rules also may be used for access to the middle radio in the opposite direction in case the middle radio 410 does get utilized.

A TXOP duration rule may be applied to the same-direction access by other non-latency-sensitive traffic on the middle radio 410. Assume that there is a low-latency traffic scheduled to be being transmitted through the first outer radio 405. However, this traffic is not in the buffer and the second, middle radio 410 wins contention and non-low latency data 420 from another source is transmitted from the second, middle radio 410. The client device response with an acknowledgment (ACK) frame 440. If low-latency traffic 425 is generated and transmitted on the third, outer radio 415, while the second middle radio 410 is transmitting, a new uplink PPDU 430 will pad the end of the current uplink PPDU so a response frame (ACK) 435 in the downlink can be successfully decoded. The length of the new uplink PPDU 430 is set so the transmissions by the second, middle radio 410 and the third, outer radio 415 end simultaneously. Therefore, it is best if the original non-latency data 420 is not too long.

Because any transmission or reception on the second, middle radio 410 limits what can be sent on the first and third outer radios 405, 415, a general policy of giving encouraging use of the outer radios 405, 415 may be selected as described herein.

A wake-up signal as defined by TGba is a very low-rate signal that may be possible to decode even in presence of leakage interference. In such a case, it is possible to transmit the wake-up signal on the second, middle radio 410 and allow it to wake either of the first or third outer radios 405, 415 links independently of the status of the other outer radio 415, 405, respectively.

In at least some embodiments, a NSTR radio can support some amount of transmit and receive combinations between NSTR radio pairs. A radio is considered NSTR, because it does not meet the standards to qualify as an STR radio. However, an access point can determine what received signal strength indicator values (RSSI) for a received signal will be decoded by an NSTR radio even during a transmit event.

An example embodiment for a calibration procedure to determine support on NSTR radios includes: (i) for each NSTR radio pair on a client device that is a non-access point MLD device, sending by the access point an NDPA/NDP to one of the client device's MLD radios (link A); (ii) receiving explicit feedback from the MLD link A; (iii) simultaneously to when the device is sending explicit feedback on link A, sending by link B a BAR at a high data rate at the highest level it can support (this could also be any type of data frame that elicits an ACK to show successful reception after checking the block ACK bitmap); if the client device responds with a block ACK, that block ACK is considered a successful try; (iv) the calibration procedure retries steps (i)-(iv) but with a lower transmission power level on the BAR; and (v) the access point chooses another NSTR radio pair and repeats steps 1-5.

This calibration process is useful to determine the extent an NSTR MLD device such as an access point or a client device will be able to receive regardless of whether it is transmitting. Once determined, the scheduler can be configured to allow simultaneous transmission and reception on the NSTR radios, within the capability of the NSTR radios, to increase throughput, reduce latency, or both increase throughput and reduce latency.

In case of multiple NSTR-constrained devices, the outcome of the above calibration scheme is then taken into consideration in making a decision on prioritizing a link based on a gradual logic (i.e., a cost metric defined for "how well" STR will work and "how urgent" traffic is).

Additionally, and a described in more detail herein, load balancing can be used with an access point having multiple radios such as a three-radio configuration. When a link steering mechanism is available, the access point generally will try to balance loads between its radios or links when one or more of them become congested by spreading the load between the radios, taking into consideration client device preferences, traffic loads, capabilities, etc. There are several ways to balance the load between radios in an access point as described in more detail herein. Link steering can be performed utilizing any available tool provided by the standards (or vendor-specific agreements), including link recommendations or enforceable link disablement.

Figure 5:
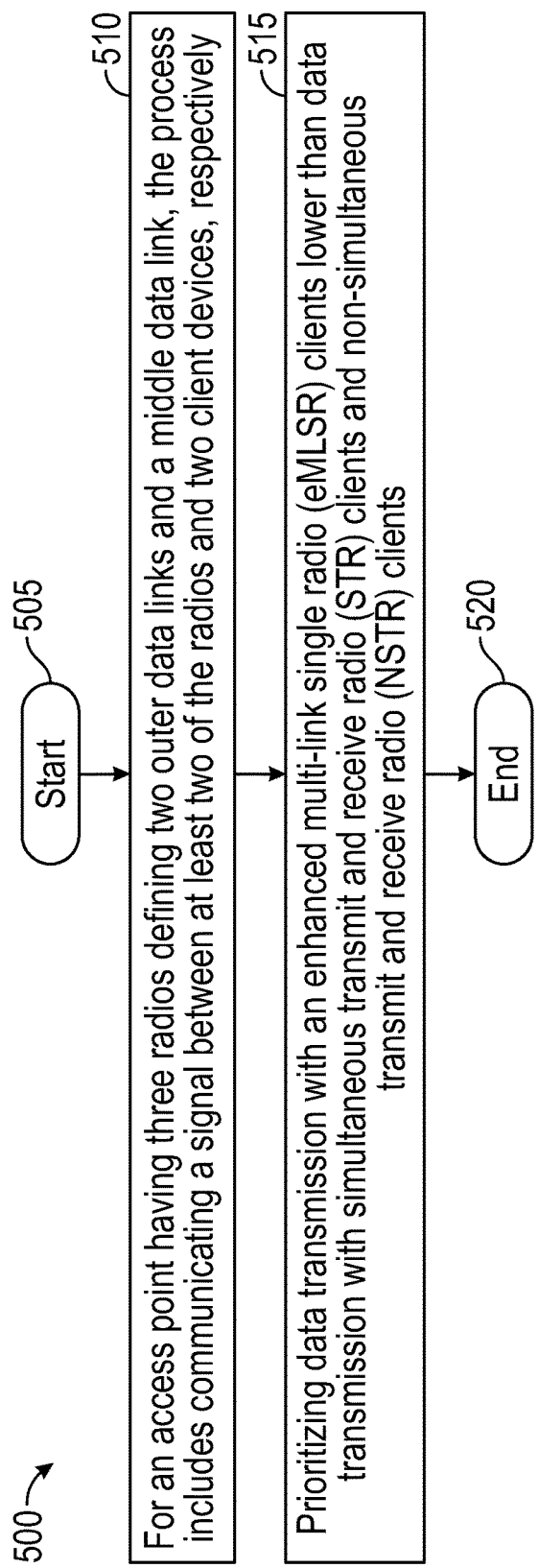
FIG. 5 is a flow chart illustrating a process for balancing loads.

FIG. 5 is a flowchart illustrating one possible embodiment of a process 500 for balancing loads. The process starts at operation 505. For an access point having three radios defining two outer data links and a middle data link, the process includes communicating a signal between at least two of the radios and two client devices, respectively. Operation 510. The process further includes prioritizing data transmission with an enhanced multi-link single radio (eMLSR) client devices lower than data transmission with simultaneous transmit and receive radio (STR) client devices and non-simultaneous transmit and receive radio (NSTR) client devices. Operation 515. Ways to implement the operations of method 500 are described in more detail herein. Additional operations that can be included in the process are also described in more detailer herein.

MLD client devices are generally expected to operate in one of three modes. One mode is STR where a client device has two radios that can operate independently of each other. Each radio selectively provides one link. Another mode is NSTR where a client device has two radios. When one radio in an NSTR client device transmits, the other radios cannot receive at the same time (due to internal interference). Yet another possible mode is eMLSR where a client device has a single main radio that can switch its link of operation after receiving an initial frame. The radio then can listen for an initial frame in two links at the same time.

When two or more links of an access point having multiple radios, are congested, a link steering/disablement operation prioritizes the eMLSR client devices lower than STR/NSTR client devices. As discussed in more detail herein, eMLSR's can occupy only one link at any instance. As a result, there is an advantage in removing an eMLSR device from a link when both links in the access point are busy.

An NSTR client device may occupy both links, but it will have a smaller chance in doing so compared to an STR client device due to constraints. As a result, an NSTR client device also can be prioritized lower than an STR client device.

An embodiment of the load balancing mechanism disclosed herein observes the operation mode of the client devices. It also observes the power-save state of the NSTR and STR client devices on the links. If the NSTR or STR client device has been generally in a power save state on one link, the access point treats this client device as a single-link client device and deprioritizes it for load balancing. Then depending on the criticality of the load levels in the basic service set (BSS), client devices are selected from the highest priority and initiated for link steering.

Multi-radio devices, including those with STR or NSTR radios, may receive a vendor-specific notification inviting them to switch to eMLSR mode, or risk losing access to one link completely. Some client devices are expected to have the capability to re-assign antennas to basebands and switch between multi-radio operation (e.g., with 2 chains on each link) and eMLSR operation (e.g., 3 or 4 chains allocated to one main radio). The multi-radio devices will lose performance if access to one link is completely lost by the load balancing processes disclosed herein and will in fact perform poorer than the eMLSR device that continues to enjoy access to both links. An advantage of at least some of these notifications is that they invite client devices to reduce from multi-radio operation to eMLSR operation to reduce loads, and yet continue to perform better than a non-MLD device.

Figure 6:
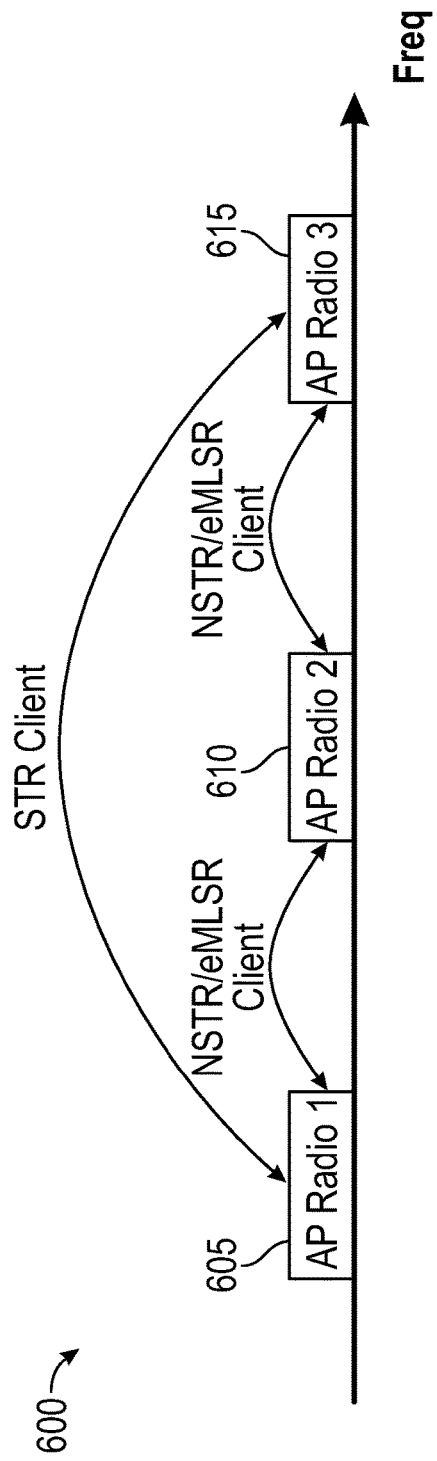
FIG. 6 illustrates an access point MLD having three radios.

FIG. 6 illustrates an embodiment 600 of an access point MLD having three radios. The radios include first and third outer radio 605 and 615, and a second, middle radio. The radios 605, 610, 615 operating in the 5 GHz and 6 GHz spectrums and are able to perform STR between the lowest end of the spectrum and the highest end of the spectrum (i.e., between the first and third outer radios 605, 615), but most multi-radio client devices still will be unable to perform STR between the middle radio 610 and either of the outer radios 650, 615. To encourage STR operation by the client device, the access point can prioritize link steering (at association time or during load balancing) by prioritizing client devices that have the potential to operate as STR for the outer data links operating at the lower and higher frequencies. NSTR and eMLSR client devices are prioritized for the center data link.

There may not be an enforceable link steering mechanism (short of disassociating client devices) available. If there is not an enforceable link steering mechanism, a coverage-based approach can be used if link recommendation methods fail to provide a desirable outcome. For an over congested link operating the 6 GHz spectrum, for example, at least some possible embodiments limit coverage of the over-loaded 6 GHz link to lead a proportion of client devices to believe that the link is out of reach.

Examples of coverage limiting tools include: (i) reducing the transmit power in the overloaded radio, while possibly increasing the transmit power of under-loaded radios; (ii) reducing sensitivity of radios in the access point for receiving signals; (iii) reducing the antenna beamwidth for the overloaded radios (e.g., Marlin antenna), segmenting the cell using directional antennas (e.g. reduction of power in antennas pointing to one direction or static beamforming to physical directions); and media access control (MAC) tools for unified licensing (UL) Ack withholding and for steering downloading (DL) traffic and triggers away from the over-loaded radios.

Figure 7:
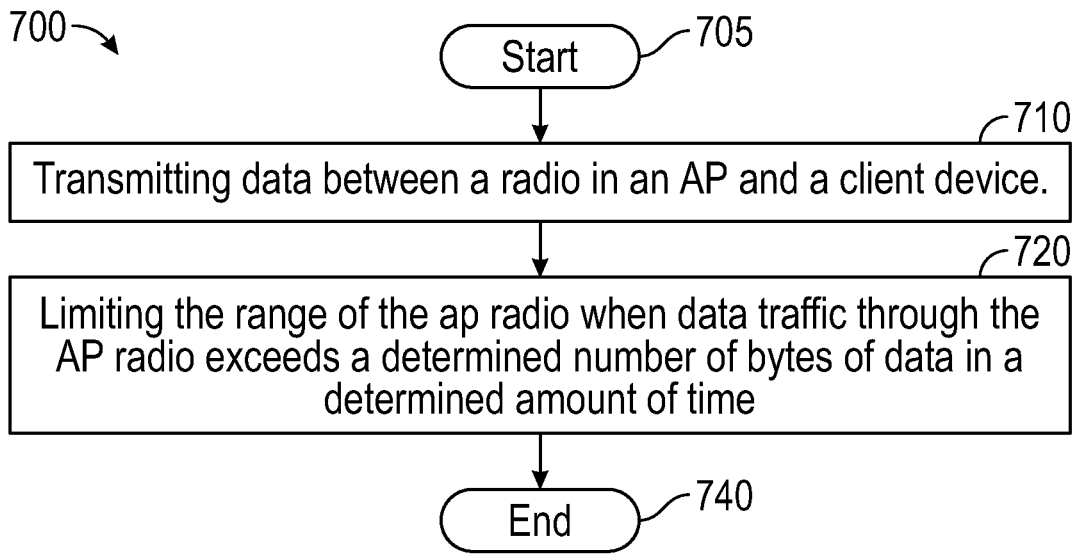
FIG. 7 is a flow chart of a process for steering links to balance loads.

FIG. 7 is a flowchart illustrating a process 700 of steering links to balance loads. The process 700 starts at operation 705. The process includes transmitting data between a radio in an access point and a client device. Operation 710. The process also includes limiting the range of the access point radio when data traffic through the access point radio exceeds a determined number of bytes of data in a determined amount of time. Operation 720. Ways to implement the operations of method 700 are described in more detail herein. Additional operations that can be included in the process also are described in more detail herein.

Figure 8:
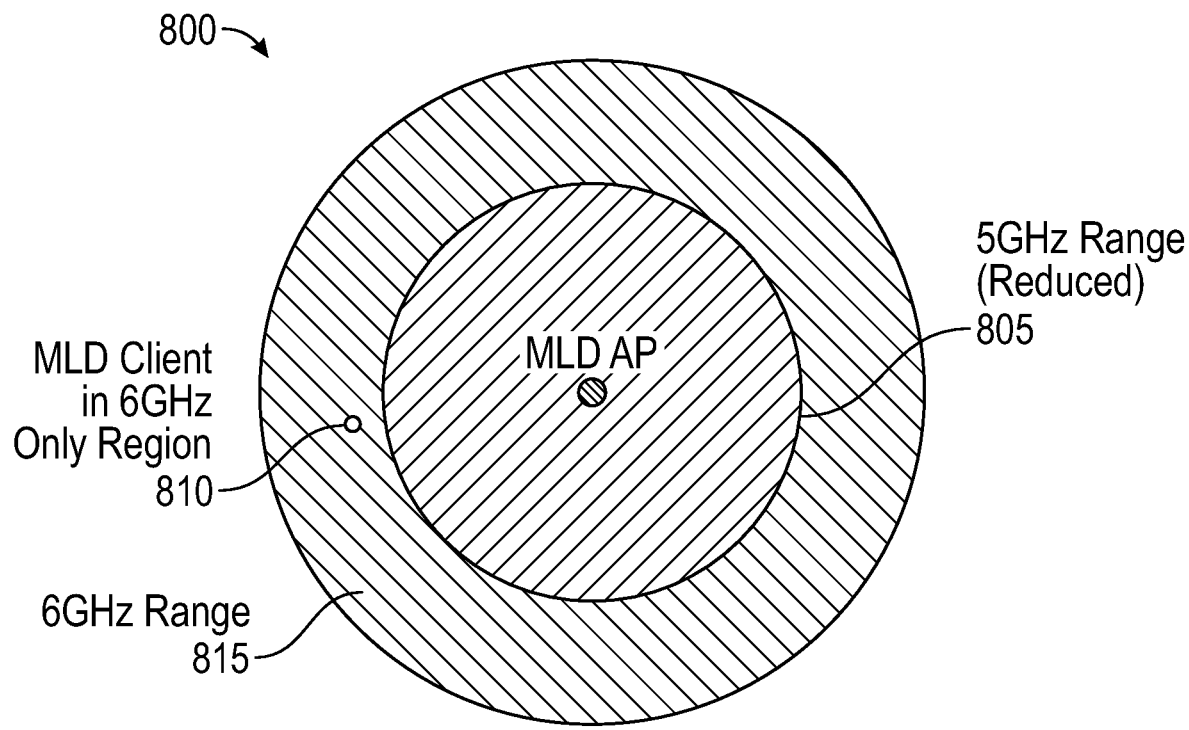
FIG. 8 illustrates radio frequency coverage for an access point.

FIG. 8 illustrates radio frequency coverage 800 for an access point and provides an example of cell-range adjustment for intra-MLD load balancing between radios. In this example, a link in the 5 GHz spectrum 805 has been excessively loaded and the access point MLD therefore reduces the range of this link in the 5 GHz spectrum 805 by adjusting transmit power, the receiving sensitivity, or a combination thereof. This reduction in the range of the link in the 5 GHz spectrum leaves MLD client devices 810 operating in the 6 GHz-only spectrum 815 with only the 6 GHz radio to operate.

In various embodiments, the load balancing processes disclosed herein may be applied alone or in combination with one or more of the other load balancing processes. For example, in a segmentation scheme, a segment that targets more than one multi-radio client device may be selected. Additionally, factors that are considered when balancing loads for radios in an access point MLD include client device MLD operation modes, the number of access point radios, and the extent to which intra-MLD load balancing is allowed by IEEE 802.11be.

Figure 9:
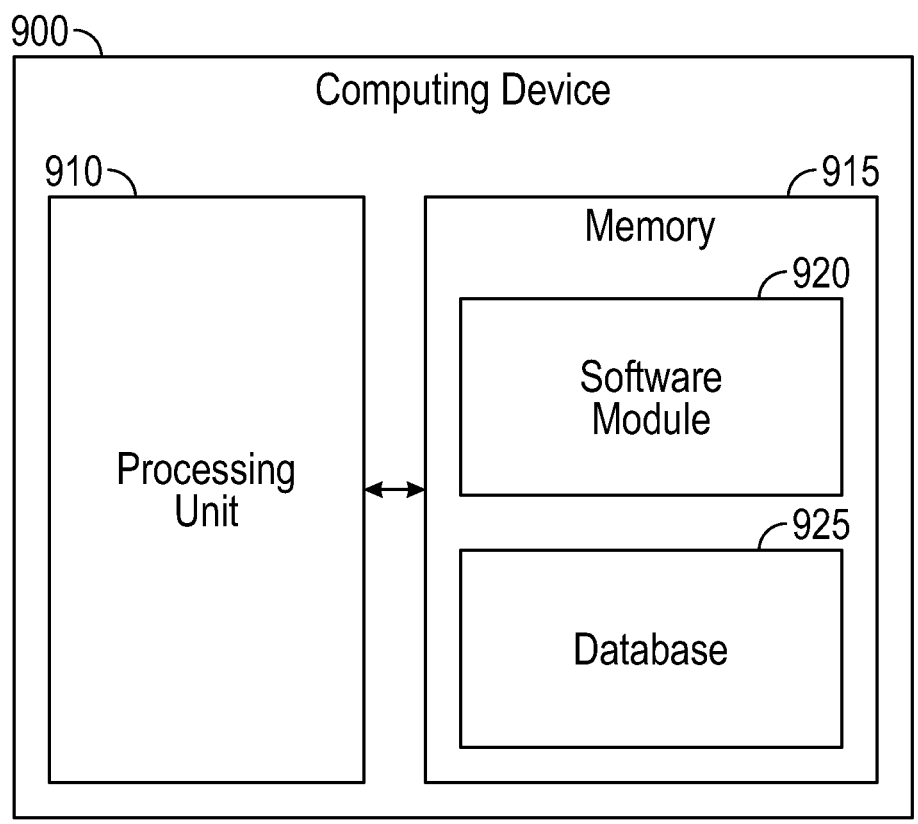
FIG. 9 is a block diagram of a computing device.

FIG. 9 shows computing device 900. As shown in FIG. 9, computing device 900 may include a processing unit 910 and a memory unit 915. Memory unit 915 may include a software module 920 and a database 925. While executing on processing unit 910, software module 920 may perform, for example, processes for adaptive baseline bandwidth selection, reducing misalignment via PSC driven channelization, and automatic PSC enforcement as described herein.

Computing device 900 may be implemented using a Wi-Fi access point, a tablet device, a mobile device, a smart phone, a telephone, a remote-control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 900 may comprise any computer operating environment, such as hand-held devices, multiprocessor systems, microprocessor-based or programmable sender electronic devices, minicomputers, mainframe computers, and the like. Computing device 900 may also be practiced in distributed computing environments where tasks are performed by remote processing devices. The aforementioned systems and devices are examples, and computing device 900 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of intransient instructions for executing a computer process. The computer program product also may be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having intransient computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements disclosed herein may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 900 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

A computer-readable medium that stores a set of intransient instructions, which when executed perform a method executed by the set of instruction, the method comprising:

One aspect is a system comprising a memory storage and a processing unit disposed in a station. The processing unit is in data communication with the memory and three radios. The three radios define a first outer data link, a second outer data links, and a middle data link, the processing unit is operative to bias access to the middle data link in one direction upon a data transmission through the first and second outer data links being dominate in an opposite direction.

Another aspect is a system, alone or in any combination with the previous embodiments and aspects disclosed herein, wherein the processing unit is operative to apply enhanced distributer channel access (EDCA) process when biasing access to the middle data link.

Another aspect is a system, alone or in any combination with the previous embodiments and aspects disclosed herein, wherein the processing unit is operative to execute a schedule when biasing access to the middle data link.

Another aspect is a system, alone or in any combination with the previous embodiments and aspects disclosed herein, wherein the processing unit is operative to execute a retry algorithm when biasing access to the middle data link.

Another aspect is a system, alone or in any combination with the previous embodiments and aspects disclosed herein, wherein the processing unit is operative to bias access to the middle data link in one direction upon latency-sensitive traffic is being transmitted the opposite direction.

Another aspect is a system, alone or in any combination with the previous embodiments and aspects disclosed herein, wherein the processing unit is operative to apply a transmission opportunity (TXOP) duration rule to same-direction data transmission by other non-latency-sensitive traffic on the middle link.

Another aspect is a system, alone or in any combination with the previous embodiments and aspects disclosed herein, wherein the processing unit is operative to give preference to transmission and reception of data on the first and second outer data links over transmission and reception on the middle data link.

Another aspect is a system, alone or in any combination with the previous embodiments and aspects disclosed herein, wherein the processing unit is operative to transmit a wake-up signal on the middle data link thereby waking the first outer data links independently of the status of the second outer data link when there is leakage interference between the middle data link and the first outer data links.

Another aspect is a system, alone or in any combination with the previous embodiments and aspects disclosed herein, wherein the processing unit is operative to prioritize data transmission with enhanced multi-link single radio (eMLSR) client devices lower than data transmission with simultaneous transmit and receive radio (STR) client devices and non-simultaneous transmit and receive radio (NSTR) client devices.

Another aspect is a system, alone or in any combination with the previous embodiments and aspects disclosed herein, wherein the processing unit is operative to control an STR client device or NSTR client device as single link radio when the STR client device or NSTR client device, respectively, has a data link operating in a power saving state.

Another aspect is a system, alone or in any combination with the previous embodiments and aspects disclosed herein, wherein the STR radio client device is from a determined vendor, the processing unit being operative to send a notification inviting the STR radio client device to operating in the eMLSR mode; and the NSTR radio client device is from a determined vendor, the processing unit being operative to send a notification inviting the NSTR radio client device to operating in the eMLSR mode.

Another aspect is a system, alone or in any combination with the previous embodiments and aspects disclosed herein, wherein the processing unit is in data communication with three access point radios, the first access point radio defining a first outer data link in a low frequency portion of a frequency spectrum, the second access point radio defining a middle data link in a middle portion of the frequency spectrum, the third access point radio defining a third outer data link in a high portion of the frequency spectrum, the processing unit operative to steer data transmission STR radio client devices to the first and second radios, and steer data transmission for eMLSR and NSTR client devices to the middle access point radio.

Another aspect is a system, alone or in any combination with the previous embodiments and aspects disclosed herein, wherein is in data communication with an access point radio, the access point radio configured for data transmission. The processing unit is operative to limit the range of the access point radio when the data traffic through the access point radio exceeds a determined number of bytes of data in a determined amount of time.

Another aspect is a system, alone or in any combination with the previous embodiments and aspects disclosed herein, wherein limiting the range of the access point radio is limited by an operation selected from the group of reducing the transmit power of the access point radio, decreasing sensitivity of the access point radio, and combinations thereof.

Another aspect is a system, alone or in any combination with the previous embodiments and aspects disclosed herein, wherein limiting the range of the access point radio is limited by an operation selected from the group of reducing the transmit power of the access point radio, decreasing sensitivity of the access point radio, and combinations thereof.

Another aspect is a method, alone or in any combination with the previous embodiments and aspects disclosed herein, wherein an access point comprises three radios defining two outer data links and a middle data link. The method comprises transmitting a signal through at least one of the outer data links; and biasing access to the middle data link in one direction upon a data transmission through the first and second outer data links being dominate in an opposite direction.

Another aspect is a method, alone or in any combination with the previous embodiments and aspects disclosed herein, the method comprising applying enhanced distributer channel access (EDCA) process when biasing access to the middle data link.

Another aspect is a method, alone or in any combination with the previous embodiments and aspects disclosed herein, the method comprising executing a schedule when biasing access to the middle data link.

Another aspect is a method, alone or in any combination with the previous embodiments and aspects disclosed herein, wherein the method comprising executing a retry algorithm when biasing access to the middle data link.

Another aspect is a method, alone or in any combination with the previous embodiments and aspects disclosed herein, wherein the action of biasing access to the middle data link in one direction is [performed upon latency-sensitive traffic is being transmitted the opposite direction.

Another aspect is a method, alone or in any combination with the previous embodiments and aspects disclosed herein, the method comprising applying a transmission opportunity (TXOP) duration rule to same-direction data transmission by other non-latency-sensitive traffic on the middle link.

Another aspect is a method, alone or in any combination with the previous embodiments and aspects disclosed herein, the method comprising giving preference to transmission and reception of data on the first and second outer data links over transmission and reception on the middle data link.

Another aspect is a method, alone or in any combination with the previous embodiments and aspects disclosed herein, the method comprising transmitting a wake-up signal on the middle data link thereby waking the first outer data links independently of the status of the second outer data link when there is leakage interference between the middle data link and the first outer data links.

Another aspect is a method, alone or in any combination with the previous embodiments and aspects disclosed herein, the method comprising, for an access point having three radios defining two outer data links and a middle data link, communicating a signal between at least two of the radios and two client devices respectively; and prioritizing data transmission with an enhanced multi-link single radio (eMLSR) client devices lower than data transmission with simultaneous transmit and receive radio (STR) client devices and non-simultaneous transmit and receive radio (NSTR) client devices.

Another aspect is a method, alone or in any combination with the previous embodiments and aspects disclosed herein, the method comprising controlling an STR client device or NSTR client device as single link radio when the STR client device or NSTR client device, respectively, has a data link operating in a power saving state.

Another aspect is a method, alone or in any combination with the previous embodiments and aspects disclosed herein, the method comprising sending a notification inviting the STR radio client device to operate in the eMLSR mode when the STR radio client device is from a determined vendor; and sending a notification inviting the NSTR radio client device to operate in the eMLSR mode when the NSTR radio client device is from a determined vendor.

Another aspect is a method, alone or in any combination with the previous embodiments and aspects disclosed herein, comprising steering data transmission STR radio client devices to first and second radios; and steering data transmission for eMLSR and NSTR client devices to a middle access point radio.

Another aspect is a method, alone or in any combination with the previous embodiments and aspects disclosed herein, the method comprising transmitting data between a radio in an access point and a client device; and limiting the range of the access point radio when data traffic through the access point radio exceeds a determined number of bytes of data in a determined amount of time.

Another aspect is a method, alone or in any combination with the previous embodiments and aspects disclosed herein, wherein the act of limiting the range of the access point radio is limited by an operation selected from the group of reducing the transmit power of the access point radio, decreasing sensitivity of the access point radio, and combinations thereof.

Another aspect is a method, alone or in any combination with the previous embodiments and aspects disclosed herein, wherein the act of limiting the range of the access point radio is limited by an operation selected from the group of reducing the transmit power of the access point radio, decreasing sensitivity of the access point radio, and combinations thereof.

Another aspect is a computer-readable medium that stores an set of intransient instructions, alone or in any combination with the previous embodiments and aspects disclosed herein, which when executed perform a method executed by the set of instruction, the method comprising, for an access point having three radios defining two outer data links and a middle data link, transmitting a signal through at least one of the outer data links; and biasing access to the middle data link in one direction upon a data transmission through the first and second outer data links being dominate in an opposite direction.

Another aspect is a computer-readable medium that stores a set of intransient instructions, alone or in any combination with the previous embodiments and aspects disclosed herein, which when executed perform a method executed by the set of instruction, the method comprising, applying enhanced distributer channel access (EDCA) process when biasing access to the middle data link.

Another aspect is a computer-readable medium that stores a set of intransient instructions, alone or in any combination with the previous embodiments and aspects disclosed herein, which when executed perform a method executed by the set of instruction, the method comprising executing a schedule when biasing access to the middle data link.

Another aspect is a computer-readable medium that stores a set of intransient instructions, alone or in any combination with the previous embodiments and aspects disclosed herein, which when executed perform a method executed by the set of instruction, the method comprising executing a retry algorithm when biasing access to the middle data link.

Another aspect is a computer-readable medium that stores a set of intransient instructions, alone or in any combination with the previous embodiments and aspects disclosed herein, which when executed perform a method executed by the set of instruction, the method comprising biasing access to the middle data link in one direction is [performed upon latency-sensitive traffic is being transmitted the opposite direction.

Another aspect is a computer-readable medium that stores a set of intransient instructions, alone or in any combination with the previous embodiments and aspects disclosed herein, which when executed perform a method executed by the set of instruction, the method comprising, applying a transmission opportunity (TXOP) duration rule to same-direction data transmission by other non-latency-sensitive traffic on the middle link.

Another aspect is a computer-readable medium that stores a set of intransient instructions, alone or in any combination with the previous embodiments and aspects disclosed herein, which when executed perform a method executed by the set of instruction, the method comprising, giving preference to transmission and reception of data on the first and second outer data links over transmission and reception on the middle data link.

Another aspect is a computer-readable medium that stores a set of intransient instructions, alone or in any combination with the previous embodiments and aspects disclosed herein, which when executed perform a method executed by the set of instruction, the method comprising, transmitting a wake-up signal on the middle data link thereby waking the first outer data links independently of the status of the second outer data link when there is leakage interference between the middle data link and the first outer data links.

Another aspect is a computer-readable medium that stores a set of intransient instructions, alone or in any combination with the previous embodiments and aspects disclosed herein, which when executed perform a method executed by the set of instruction, the method comprising, for an access point having three radios defining two outer data links and a middle data link, communicating a signal between at least two of the radios and two client devices respectively; and prioritizing data transmission with an enhanced multi-link single radio (eMLSR) client devices lower than data transmission with simultaneous transmit and receive radio (STR) client devices and non-simultaneous transmit and receive radio (NSTR) client devices.

Another aspect is a computer-readable medium that stores a set of intransient instructions, alone or in any combination with the previous embodiments and aspects disclosed herein, which when executed perform a method executed by the set of instruction, the method comprising, controlling an STR client device or NSTR client device as single link radio when the STR client device or NSTR client device, respectively, has a data link operating in a power saving state.

Another aspect is a computer-readable medium that stores a set of intransient instructions, alone or in any combination with the previous embodiments and aspects disclosed herein, which when executed perform a method executed by the set of instruction, the method comprising, sending a notification inviting the STR radio client device to operate in the eMLSR mode when the STR radio client device is from a determined vendor; and sending a notification inviting the NSTR radio client device to operate in the eMLSR mode when the NSTR radio client device is from a determined vendor.

Another aspect is a computer-readable medium that stores a set of intransient instructions, alone or in any combination with the previous embodiments and aspects disclosed herein, which when executed perform a method executed by the set of instruction, the method comprising, steering data transmission STR radio client devices to first and second radios; and steering data transmission for eMLSR and NSTR client devices to a middle access point radio.

Another aspect is a computer-readable medium that stores a set of intransient instructions, alone or in any combination with the previous embodiments and aspects disclosed herein, which when executed perform a method executed by the set of instruction, the method comprising, transmitting data between a radio in an access point and a client device; and limiting the range of the access point radio when data traffic through the access point radio exceeds a determined number of bytes of data in a determined amount of time.

Another aspect is a computer-readable medium that stores a set of intransient instructions, alone or in any combination with the previous embodiments and aspects disclosed herein, which when executed perform a method executed by the set of instruction, wherein the act of limiting the range of the access point radio is limited by an operation selected from the group of reducing the transmit power of the access point radio, decreasing sensitivity of the access point radio, and combinations thereof.

Another aspect is a computer-readable medium that stores a set of intransient instructions, alone or in any combination with the previous embodiments and aspects disclosed herein, which when executed perform a method executed by the set of instruction, wherein the act of limiting the range of the access point radio is limited by an operation selected from the group of reducing the transmit power of the access point radio, decreasing sensitivity of the access point radio, and combinations thereof.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
   a memory storage; and
   a processing unit disposed in a Multi-Link Device (MLD) station and coupled to the memory storage, wherein the processing unit is operative to:
   determine a dominant direction for data transmission for the MLD station, the MLD station comprising:
   a first outer data link operating at a low portion of a frequency spectrum for Simultaneous Transmit & Receive (STR) devices,
   a second outer frequency radio data link operating at a high portion of the frequency spectrum for non-Simultaneous Transmit and Receive (NSTR) devices, and
   a middle frequency radio data link operating at a middle portion of the frequency spectrum for the data transmission for the STR devices;
   transmit a signal for data transmission of an opposite direction to the dominant direction through at least one of the first outer data link or the second data link; and
   bias access to the middle data link in the dominant direction upon a data transmission through the first and second outer data links being dominate in the opposite direction.

2. The system of claim 1 wherein the processing unit is further operative to apply enhanced distributer channel access (EDCA) process when biasing access to the middle data link.

3. The system of claim 2 wherein the processing unit is further operative to execute a schedule when biasing access to the middle data link.

4. The system of claim 2 wherein the processing unit is further operative to execute a retry algorithm when biasing access to the middle data link.

5. The system of claim 1 wherein the processing unit is further operative to bias access to the middle data link in one direction upon latency-sensitive traffic is being transmitted the opposite direction.

6. The system of claim 5 wherein the processing unit is further operative to apply a transmission opportunity (TXOP) duration rule to same-direction data transmission by other non-latency-sensitive traffic on the middle link.

7. The system of claim 1 wherein the processing unit is further operative to give preference to transmission and reception of data on the first and second outer data links over transmission and reception on the middle data link.

8. The system of claim 1 wherein the processing unit is further operative to transmit a wake-up signal on the middle data link thereby waking the first outer data links independently of a status of the second outer data link when there is leakage interference between the middle data link and the first outer data links.

9. A method comprising:
   determining a dominant direction for data transmission for a Multi-Link Device (MLD) station, the MLD station comprising:
   a first outer data link operating at a low portion of a frequency spectrum for Simultaneous Transmit & Receive (STR) devices,
   a second outer frequency radio data link operating at a high portion of the frequency spectrum for non-Simultaneous Transmit & Receive (STR) devices, and
   a middle frequency radio data link operating at a middle portion of the frequency spectrum for the data transmission for the STR devices;
   transmitting a signal for data transmission of an opposite direction to the dominant direction through at least one of the first outer data link or the second data link; and
   biasing access to the middle data link in the dominant direction upon a data transmission through the first and second outer data links being dominate in the opposite direction.

10. The method of claim 9 further comprising applying enhanced distributer channel access (EDCA) process when biasing access to the middle data link.

11. The method of claim 10 further comprising executing a schedule when biasing access to the middle data link.

12. The method of claim 10 further comprising executing a retry algorithm when biasing access to the middle data link.

13. The method of claim 9 wherein biasing access to the middle data link in one direction is performed upon latency-sensitive traffic being transmitted in the opposite direction.

14. The method of claim 13 further comprising applying a transmission opportunity (TXOP) duration rule to same-direction data transmission by other non-latency-sensitive traffic on the middle link.

15. The method of claim 9 further comprising giving preference to transmission and reception of data on the first and second outer data links over transmission and reception on the middle data link.

16. The method of claim 9 further comprising transmitting a wake-up signal on the middle data link thereby waking the first outer data links independently of a status of the second outer data link when there is leakage interference between the middle data link and the first outer data links.

17. A non-transitory computer-readable medium that stores a set of intransient instructions which when executed perform a method executed by the set of instructions comprising:
  determining a dominant direction for data transmission for a Multi-Link Device (MLD) station, the MLD station comprising:
    a first outer data link operating at a low portion of a frequency spectrum for Simultaneous Transmit & Receive (STR) devices,
    a second outer frequency radio data link operating at a high portion of the frequency spectrum for non-Simultaneous Transmit & Receive (NSTR) devices, and
    a middle frequency radio data link operating at a middle portion of the frequency spectrum for the data transmission for the STR devices;
  transmitting a signal for data transmission of an opposite direction to the dominant direction through at least one of the first outer data link and the second outer data link; and
  biasing access to the middle data link in the dominant direction upon a data transmission through the first and second outer data links being dominate in the opposite direction.

18. The non-transitory computer-readable of claim 17 further comprising executing a retry algorithm when biasing access to the middle data link.

19. The non-transitory computer-readable of claim 17 wherein biasing access to the middle data link in one direction is performed upon latency-sensitive traffic being transmitted in the opposite direction.

20. The non-transitory computer-readable of claim 17 further comprising giving preference to transmission and reception of data on the first and second outer data links over transmission and reception on the middle data link.

* * * * *